United States Patent [19]

Behrendt et al.

[11] 4,249,500

[45] Feb. 10, 1981

[54] FLAPPER LINKAGE IN AIR INTAKE CONTROL SYSTEM OF INTERNAL COMBUSTION ENGINE

[75] Inventors: Bernhard Behrendt, Grossbottwar; Gerhard Brenner, Asperg; Heinz Fischer, Leonberg; Rudolf Leipelt, Oberstenfeld, all of Fed. Rep. of Germany

[73] Assignee: Filterwerk Mann & Hummel GmbH, Ludwigsburg, Fed. Rep. of Germany

[21] Appl. No.: 9,856

[22] Filed: Feb. 6, 1979

[30] Foreign Application Priority Data

Feb. 25, 1978 [DE] Fed. Rep. of Germany ... 7805694[U]

[51] Int. Cl.³ .......................................... F02M 31/00
[52] U.S. Cl. ..................... 123/556; 236/13; 123/552
[58] Field of Search ................ 123/122 H, 122 D; 236/13

[56] References Cited

U.S. PATENT DOCUMENTS

| | | | |
|---|---|---|---|
| 3,513,817 | 5/1970 | Kearley | 123/122 D |
| 3,913,544 | 10/1975 | Fyie | 123/122 D |
| 4,144,857 | 3/1979 | Bendy | 123/122 D |
| 4,161,930 | 7/1979 | Bendy | 123/122 D |

*Primary Examiner*—Ronald H. Lazarus
*Attorney, Agent, or Firm*—Joseph A. Geiger

[57] ABSTRACT

A linkage connection for connecting a wax thermostat and membrane actuator drive assembly to a flapper-type flow proportioning valve in the air intake system of a carburetor-equipped internal combustion engine, the connection comprising a connecting cylinder formation in the flapper wall with a transverse slot and a groove in an extension of the thermostat housing with two positioning flanks which cooperate with the connecting cylinder.

4 Claims, 4 Drawing Figures

U.S. Patent     Feb. 10, 1981     4,249,500
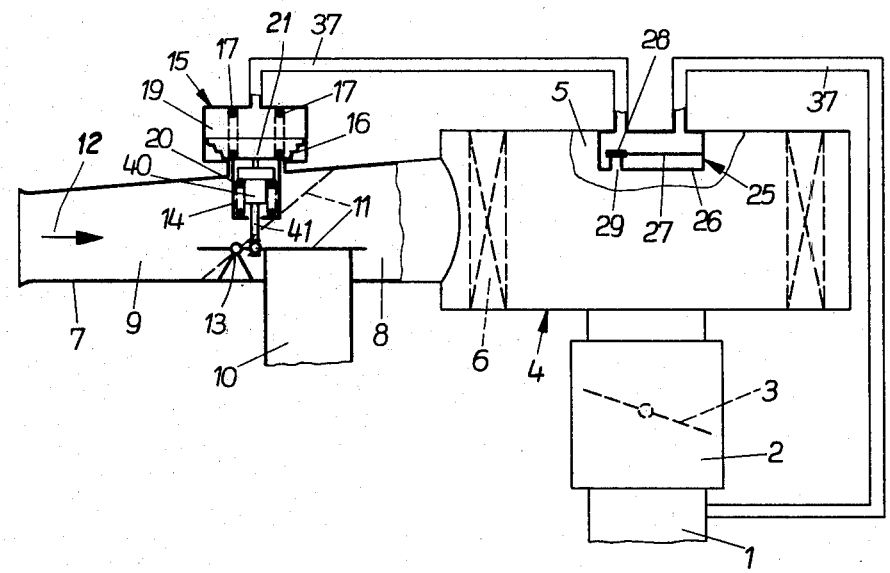
Fig. 1
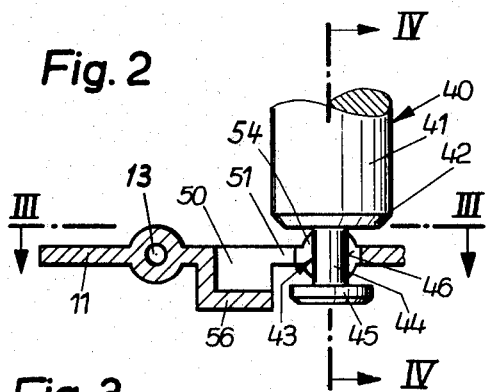
Fig. 2
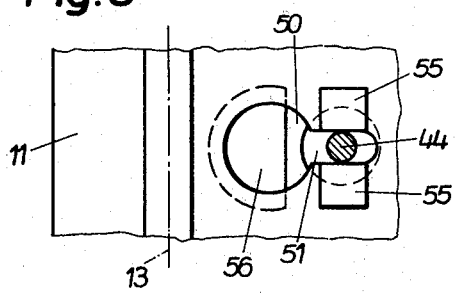
Fig. 3
Fig. 4

FLAPPER LINKAGE IN AIR INTAKE CONTROL SYSTEM OF INTERNAL COMBUSTION ENGINE

BACKGROUND OF THE INVENTION

1. Field of the Invention

The present invention relates to air intake systems for carburetor-equipped internal combustion engines, and, more particularly, to the linkage for a continuously adjustable flapper-type air mixing valve which is controlled by a pneumatic membrane actuator and a wax thermostat, to mix cold raw air with preheated raw air, for an optimal raw air temperature, under changing operating conditions.

2. Description of the Prior Art

The use of a pivotable flapper as a flow proportioning valve at the junction point between a cold air intake duct and a warm air intake duct has enjoyed widespread acceptance in connection with control systems which are designed to maintain an optimal raw air intake temperature for carburetor-equipped internal combustion engines. This flapper is normally so arranged that in each of the two pivoting end positions it closes off one of the two raw air intake ducts, while fully opening the other, admitting variable amounts of cold and preheated raw air, respectively, in all intermediate positions.

It has also become common practice to use for the positioning of the flapper a pneumatic membrane actuator which is driven by the negative pressure which results from the aspirating action of the pistons, and which is tapped downstream of the main throttle of the carburetor.

It has further been suggested that the flapper positioning action of the membrane actuator be combined with the adjustment action of a wax thermostat sensing the air temperature in the cold air intake duct. The interaction of this wax thermostat with the flapper may be in the form of a movable flapper stop which, under certain operating conditions, prevents the flapper from fully closing the warm air intake duct, or the wax thermostat may form a part of the drive connection between the membrane actuator and the flapper. In the latter case, the wax thermostat increases or decreases the effective length of the drive connection, in response to changes in the ambient temperature. An arrangement where the wax thermostat serves as an adjustable flapper stop is disclosed in U.S. Pat. No. 4,161,930. An arrangement where the wax thermostat forms part of the drive connection between the membrane actuator and the flapper is disclosed in U.S. Pat. No. 4,144,857.

In the last-mentioned control system, in which the wax thermostat forms part of the drive connection, the pneumatic membrane actuator and the thermostat are arranged to form a preassembled, preadjusted drive unit. The wax thermostat is carried by a frame extension of the actuator housing, the thermostat housing bearing against a spring, and the thermostat drive pin engaging the drive disc of the membrane actuator. The housing of the wax thermostat thus executes longitudinal movements in the direction of the flapper, these movements reflecting the combined actions of the negative pressure in the carburetor and of the temperature sensing wax thermostat. A pivot connection between the thermostat housing and the flapper transmits the movements of the former to the latter.

A prior art suggestion of a linkage between the housing of the wax thermostat and the pivotable flapper involves the use of a round rod having one extremity permanently attached to the bottom of the thermostat housing and the other extremity angled off and engaging a matching aperture in the flapper. This arrangement, while being operationally satisfactory, has certain shortcomings with regard to the cost of mass production and assembly.

SUMMARY OF THE INVENTION

Underlying the present invention is the objective of improving the linkage connection between the housing of the wax thermostat and the pivotable flapper in a way which, while saving manufacturing costs, also simplifies the assembly operation, without reducing the operational reliability of the linkage connection.

The present invention proposes to attain this objective by suggesting a linkage connection which requires no connecting parts, other than a specially shaped integral housing extension on the wax thermostat and a matching connecting formation on the pivotable flapper itself.

In a preferred embodiment of the invention, the housing extension of the wax thermostat has an extremity of rotational outline, with a neck portion of reduced diameter arranged behind a larger head portion, so as to define an annular groove with two opposing positioning flanks which cooperate with a transversely extending cylindrical formation of the flapper, in the form of bead-like protrusions on opposite sides of the flapper wall. The connecting cylinder of the flapper fits between the positioning flanks of the thermostat housing extension, a central slot accommodating its neck portion. An opening in the flapper wall allows for the insertion of the head portion.

This novel linkage connection makes it possible to manufacture the housing of the wax thermostat as a simple automatic lathe part, with a minimum of machining operations, and to produce the pivotable flapper as an injection-molded part requiring no additional work. The previously required angled-off rod and the welding operation between it and the thermostat housing are no longer necessary.

One advantage of the novel linkage connection is that it provides a clearance-free connection between the wax thermostat and the flapper throughout the full range of flapper displacements. Furthermore, the novel connection has the advantage of maintaining its clearance-free engagement, while allowing for a lateral shift of the connecting cylinder of the flapper relative to the positioning flanks of the housing extension, in order to accommodate the arcuate movement of the flapper about its pivot axis.

The preferred embodiment of the invention further suggests a way to reduce the flow of cold raw air through the insertion opening of the flapper wall by providing over said opening a cover which is recessed from the flapper wall in the direction away from the wax thermostat. This cover is an integral part of the flapper.

BRIEF DESCRIPTION OF THE DRAWINGS

Further special features and advantages of the invention will become apparent from the description following below, when taken together with the accompanying drawing which illustrates, by way of example, an embodiment of the invention which is represented in the various figures as follows:

FIG. 1 shows, in a schematic representation, an air intake system of a carburetor-equipped internal combustion engine, where a pneumatic membrane actuator and a wax thermostat control an air flow proportioning flapper valve, in an arrangement which lends itself for incorporation of the present invention;

FIG. 2 shows, in an enlarged longitudinal cross section, portions of the flapper and of the wax thermostat of FIG. 1, embodying the linkage connection of the present invention;

FIG. 3 is a horizontal cross section through the connection of FIG. 2, taken along line III—III thereof; and FIG. 4 is a transverse cross section through the connection of FIG. 2, taken along line IV—IV thereof.

DESCRIPTION OF THE PREFERRED EMBODIMENT

In FIG. 1 of the drawing is shown schematically an air intake and carburetion system for an internal combustion engine, connected to the latter by means of an air intake manifold 1 which carries a carburetor 2 with a main throttle 3 controlling the flow of combustion air to the engine. The carburetor 2, in turn, carries a shallow cylindrical air intake filter assembly 4 which encloses an annular filter element 6. On one side of the housing of the filter assembly 4 is arranged a horizontally extending air intake snorkel 7, the combustion air flowing radially inwardly from the snorkel 7, through the filter element 6, to the clean air space 5 above the carburetor 2.

The air intake snorkel 7 consists of a first length portion which serves as a cold air intake duct 9 and a second length portion, adjoining the filter assembly 4, which serves as a raw air mixing duct 8, a vertically adjoining warm air intake duct 10 projecting into the snorkel 7 from below. The warm air intake duct 10 receives preheated raw air from a so-called exhaust stove (not shown), which is a structure associated with the exhaust manifold of the engine, where heat from the exhaust manifold is transferred to an air flow.

At the duct junction between the horizontal cold air intake duct 9 and the vertical warm air intake duct 10 is arranged an adjustable air proportioning valve in the form of a pivotable flapper 11 which has a horizontal pivot axis 13 arranged upstream of the duct junction. The flapper 11 is pivotable between a first end position in which it closes off the warm air intake duct 10, while opening the cold air intake duct 9, and a second end position in which it closes off the cold air intake duct 9, admitting only preheated air through the warm air intake duct 10. Intermediate angular positions of the flapper 11 establish corresponding flow ratios of cold—i.e. ambient—raw air and preheated raw air entering the air intake system.

The mechanism which determines the angular position of the flow proportioning flapper 11 consists of a pneumatic membrane actuator 15 and a wax thermostat 40, the two control movers being connected to the flapper 11 by a drive assembly 14. The pneumatic membrane actuator is a well-known drive component, consisting essentially of a rubber membrane 16 which executes axial movements in response to changes in the negative pressure inside a control pressure space 19 above membrane 16, in opposition to an actuator return spring 17.

Negative pressure of varying intensity is supplied to the membrane actuator 15 through a vacuum line 37 which is connected to the engine intake manifold 1, or to the carburetor, downstream of its main throttle 3. In the pressureless state, the pneumatic membrane actuator assumes a rest position in which the membrane 16 abuts against a lower stop, so that the warm air intake duct 10 is closed, or almost closed, by the flapper 11, depending on the action of the wax thermostat 40. A detailed explanation of the interaction between such a membrane actuator 15 and a wax thermostat 40 is given in the earlier-mentioned U.S. Patent Application Ser. No. 842,781.

As can further be seen in FIG. 1, the vacuum line 37 includes a temperature-controlled relief valve 25 which is arranged inside the clean air space 5 of the air intake filter 4. The relief valve 25 consists essentially of a valve housing 26 with a relief port 29 which is adjustably openable and closable by means of a valve element 28 on the free extremity of a cantilever-type bimetallic member 27. An open relief port 29 means that the negative pressure inside the vacuum line 37 is partially or completely eliminated through an air flow from the clean air space 5 into the vacuum line 37. Thus, when warmer air enters the filter assembly 4, the bimetallic member 27 responds by progressively opening the relief port 29, thereby reducing the negative pressure inside the membrane actuator 15 and displacing the flapper 11 in the direction in which it closes the warm air intake duct 10. A breather passage (not shown) in the wall of the valve housing 26, too small to affect the level of the negative pressure in the vacuum line 37, assures a transmission of the air temperature in the clean air space 5 to the bimetallic member 27. A detailed disclosure of such a temperature-controlled relief valve is given in U.S. Pat. No. 3,830,210, for example.

As is shown schematically in FIG. 1, the wax thermostat 40 has a cylindrical body, supported on a shoulder by a thermostat return spring 20 whose other extremity is carried by a frame-like extension of the pneumatic membrane actuator 15. The drive pin 21 of the wax thermostat 40 bears against the actuator membrane 16 from below. The thermostat return spring 20 is weaker than the actuator return spring 17, but strong enough to safely move and position the flapper 11. Thus, the actuator membrane 16 and the thermostat 40 are connected "in series" with respect to the flapper drive assembly 14.

The present invention concerns itself with a novel linkage connection between this drive assembly 14 and the flapper 11, an embodiment thereof being illustrated in detail in FIGS. 2-4. As can be seen in FIG. 2, the wax thermostat 40 has a cylindrical housing extension 41 with an annular groove 46 near its extremity, so as to form a head portion 45 and a neck portion 44 with oppositely facing positioning flanks 42 and 43. These flanks engage contact surfaces of a connecting cylinder 54 of the flapper 11. The cylinder 54 is part of the wall of the flapper 11, extending parallel to its pivot axis 13, and consisting of bead-like protrusions on opposite sides of the flapper wall, a central slot 51 accommodating the neck portion 44 of the housing extension 41 (FIG. 3).

In order to permit assembly of these linkage components without the need for any fastener or retainer, the flapper wall has an insertion opening 50 for the head portion 45, adjoining the slot 51. In order to reduce the leakage of cold raw air through the insertion opening 50, when the cold air intake duct 9 is completely closed, the flapper 11 may include a cover formation 56, as is shown in FIGS. 2 and 3. The flapper 11 is preferably an injection-molded part of plastic material.

The novel linkage connection of FIGS. 2–4 not only assures a clearance-free engagement between the drive assembly 14 and the flapper 11 over the entire movement range of the latter, it also allows for a lateral displacement of the connecting cylinder 54 relative to the axis of the housing extension 41 of the wax thermostat, in order to accommodate the lateral displacement component which results from the arcuate displacement of the flapper 11 about its pivot axis 13. This lateral displacement is made possible by the fact that the inner and outer positioning flanks 42 and 43 of the annular groove 46 are parallel, planar flanks. The housing extension 41 is preferably an integral part of the thermostat housing, and the latter has the shape of a body of rotation, manufactured in an automatic lathe operation.

It should be understood, of course, that the foregoing disclosure describes only a preferred embodiment of the invention and that it is intended to cover all changes and modifications of this example of the invention which fall within the scope of the appended claims.

We claim the following:

1. A device for controlling the combustion air temperature in the air intake system of an internal combustion engine, comprising a pivotable flapper which serves as a flow proportioning valve at a duct junction between an intake duct for preheated raw air and an intake duct for raw air of ambient temperature, leading to a raw air mixing duct downstream of the duct junction, the flapper being operable to progressively open and close one of the two raw air intake ducts while correspondingly closing and opening the other, as a result of being connected to a flapper drive assembly which is capable of adjusting the angular position of the flapper in response to changes in the temperature of the combustion air which is taken in by the internal combustion engine, in such an air temperature controlling device, the improvement comprising:

as part of the flapper, a flapper pivot axis, a flapper wall of generally flat configuration extending parallel to the flapper pivot axis, and a connecting cylinder formed by protrusions of the flapper wall, the cylinder axis being parallel to the flapper pivot axis; and as part of the flapper drive assembly, a drive member with a drive member extension whose axis is oriented transversely to the plane of the flapper wall and which has an end portion defining a recess with two oppositely facing positioning flanks oriented substantially perpendicularly to the axis of the drive member extension and engaging opposite sides of the connecting cylinder of the flapper, said engagement thereby allowing for lateral shifting of the connecting cylinder relative to the axis of the drive member extension, in order to accommodate arcuate displacements of the connecting cylinder about the flapper pivot axis in conjunction with substantially straight displacements of the flapper drive assembly.

2. An air temperature controlling device as defined in claim 1, wherein the connecting cylinder of the flapper is constituted by bead-like protrusions on opposite sides of the flapper wall and includes a transverse slot; and the drive member extension has the shape of a body of rotation, its end portion recess being an annular groove of an axial width which is equal to the diameter of the connecting cylinder, said groove thereby defining a head portion and a smaller neck portion which fits into the transverse slot of the connecting cylinder in the flapper wall.

3. An air temperature controlling device as defined in claim 2, wherein the drive member is a wax thermostat having a generally cylindrical housing, the drive member extension forming an integral part of the thermostat housing; and the flapper has in its wall an insertion opening adjoining said transverse slot, for the insertion of the head portion of the drive member extension across the flapper wall.

4. An air temperature controlling device as defined in claim 1, wherein the flapper wall further includes a cover formation associated with the insertion opening, for the limitation of air flow through the latter, the cover formation including a wall portion which is recessed towards the side on which the head portion of the drive member extension is located.

* * * * *

UNITED STATES PATENT AND TRADEMARK OFFICE
CERTIFICATE OF CORRECTION

PATENT NO. : 4,249,500

DATED : February 10, 1981

INVENTOR(S) : Bernhard BEHRENDT, Gerhard BRENNER, Heinz FISCHER, and Rudolf LEIPELT It is certified that error appears in the above-identified patent and that said Letters Patent are hereby corrected as shown below:

Claim 4:

In line 38 (column 6) "claim 1" should read --claim 3--.

Signed and Sealed this

Fourth Day of August 1981

[SEAL]

Attest:

GERALD J. MOSSINGHOFF

Attesting Officer

Commissioner of Patents and Trademarks